US006285636B1

(12) United States Patent
Tay et al.

(10) Patent No.: US 6,285,636 B1
(45) Date of Patent: Sep. 4, 2001

(54) OPTICAL DISC APPARATUS WITH LENS POSITION DETECTION AND CONTROL

(75) Inventors: Hiok-Nam Tay, Singapore (SG); Xiuli Guo, Irvine, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/238,065

(22) Filed: Jan. 27, 1999

(51) Int. Cl.[7] ....................................................... G11B 7/09
(52) U.S. Cl. ........................................ 369/44.35; 369/44.41
(58) Field of Search ........................... 369/44.35, 44.34, 369/44.36, 44.29, 44.41, 54

(56) References Cited

U.S. PATENT DOCUMENTS

| 4,408,314 | * | 10/1983 | Yokoda | 369/44.31 |
| 4,492,856 | * | 1/1985 | Kimura | 369/44.41 |
| 4,503,324 | * | 3/1985 | Yokoda | 369/44.39 |
| 4,761,775 | * | 8/1988 | Murakami | 369/44.39 |
| 4,998,234 | * | 3/1991 | Rees et al. | 369/44.41 |
| 5,181,195 | * | 1/1993 | Kume et al. | 369/44.41 |
| 5,504,725 | * | 4/1996 | Katsumata | 369/44.11 |
| 5,978,327 | * | 11/1999 | Kuroda et al. | 369/44.34 |

* cited by examiner

Primary Examiner—Thang V. Tran
(74) Attorney, Agent, or Firm—W. Daniel Swayze, Jr.; W. James Brady; Frederick J. Telecky, Jr.

(57) ABSTRACT

A method of generating a lens position detection signal for optical disc apparatus. The signal is generated in a way which provides continuous position information. The signal is also independent of changes in reflectivity on the surface of the optical disc. Moreover, the signal can be calibrated for DC offset due to misalignment and changes in photodetector output.

29 Claims, 4 Drawing Sheets

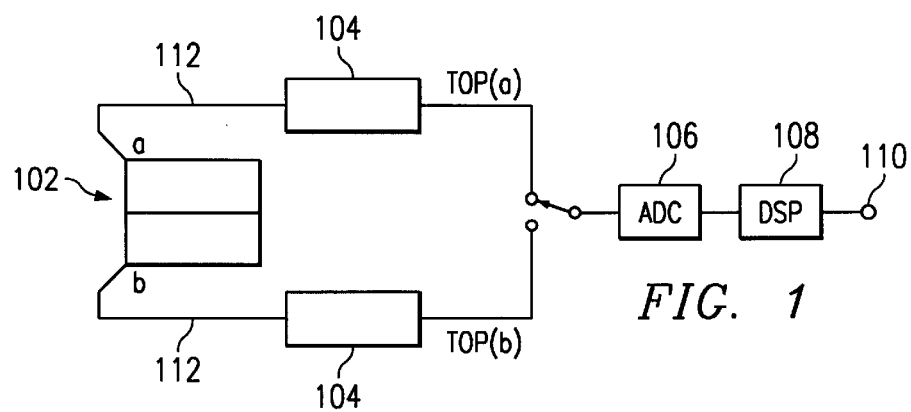
FIG. 1
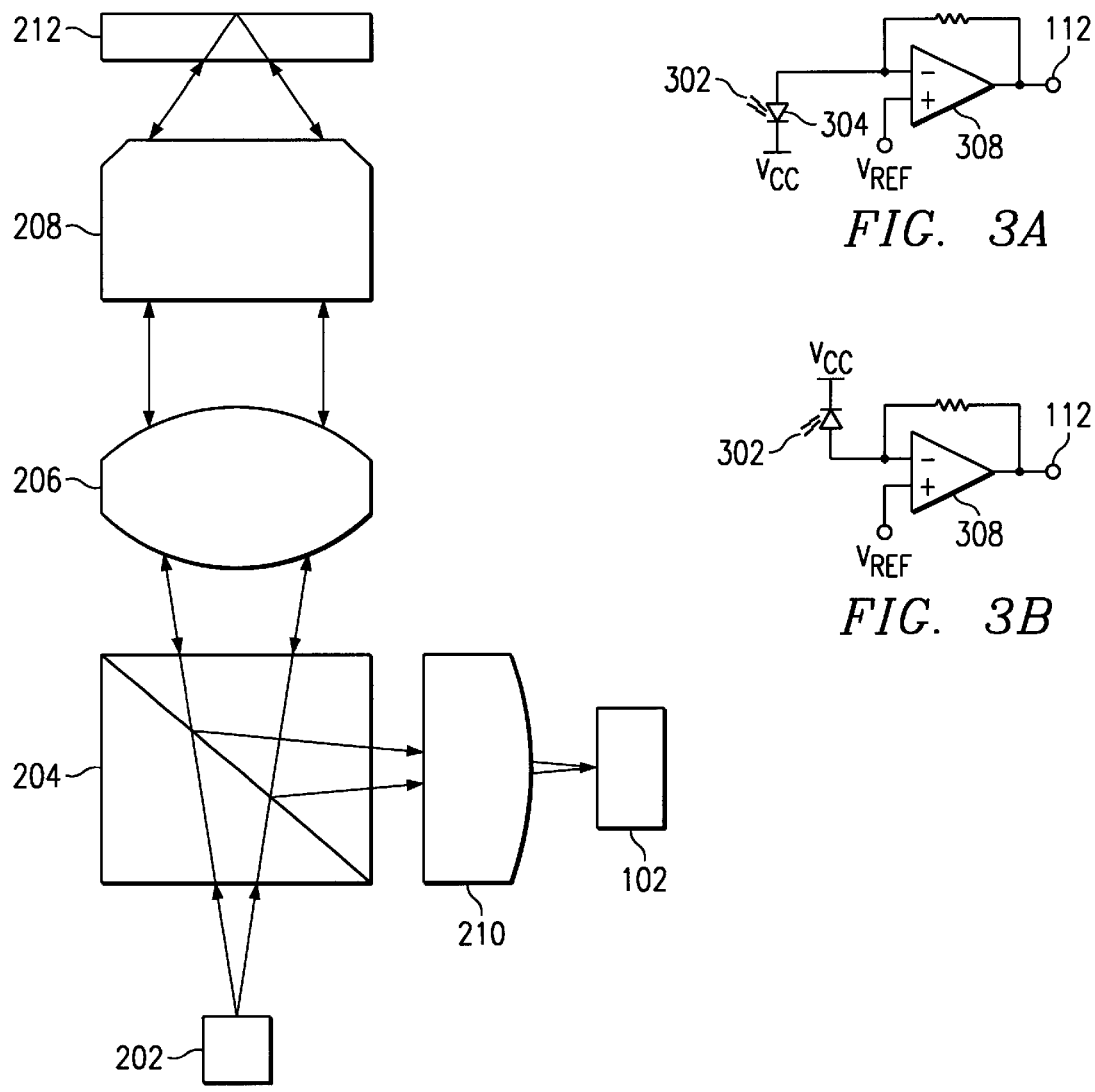
FIG. 2
FIG. 3A
FIG. 3B

OPTICAL DISC APPARATUS WITH LENS POSITION DETECTION AND CONTROL

BACKGROUND AND SUMMARY OF THE INVENTION

The present invention relates to detection of lens position in an optical disc apparatus, particularly to the generation of a lens position detection and control signal regulated by the total light reflected from the optical disc.

Background: DVD

DVD is an optical disc format known alternately as Digital Video Disc and Digital Versatile Disc. The optical disc employed with the DVD format is the same size as the traditional compact disc used in audio CD and CD-ROM applications. However, the capacity of the DVD optical disc is, at a minimum, more than seven times that of an audio CD or CD-ROM. Additionally, the data transfer rate of the DVD format is approximately six times that of the audio CD format. This increase in capacity and transfer rate allows the DVD format to provide for a wide variety of applications.

The DVD format can be used for video, data storage, audio applications, and interactive videos, games, etc. Moreover, the DVD format allows each of these applications a greater flexibility than they would otherwise have under conventional video or audio CD formats or CD-ROM. In video, the resolution offered by the DVD format is much closer to the source video, at 720 pixels per horizontal line, than the VHS standard of 320 pixels per horizontal line. The DVD format also offers Dolby Pro Logic or AC-3 and MPEG-2 audio formats on up to eight separate soundtracks. Other features offered by the DVD format are multiple subtitle tracks and multiple video aspect ratios all on the same disc.

Additionally, DVD-ROM drives used in computers and home DVD players are compatible with current audio CD and CD-ROM formats. DVD-ROM drives require increased seeking and disc rotation speeds for finding and reading the data stored on the optical disc more quickly than is required for home DVD player use. As stated above, the data transfer rate standard for DVD players is only six times that of audio CDs. However, CD-ROM drives currently read data at over twenty-four times the data transfer rate of audio CDs. To be competitive in the computer market, DVD-ROM drives must be able to access and transfer data at least as quickly as their CD-ROM drive competition. Home DVD players do not currently have the same demands as they are not put to as versatile uses as DVD-ROM drives.

Background: Optical Disc Apparatus

FIG. 2 illustrates a typical optical disc apparatus 214 for reading information from an optical disc. Laser light emitted from a laser diode 202 passes through a beamsplitter prism 204, a collimating lens 206, and a focusing lens 208 that focuses the laser light onto a particular track of the optical disc 212. Laser light reflected from the surface of the disc passes through the focusing lens 208 and the collimating lens 206. The light then reflects off the surface of the beamsplitter prism 204 through a cylindrical lens 210 and finally illuminates a photo-detector array 102. The photo-detector array 102 converts the received light energies into electric signals. The entire apparatus 214 is known as the "pickup". The focusing lens 208 is typically held in a lens holder attached by a spring mechanism to the pickup body. Lens position is controlled by permanent magnets mounted to the pickup body. Wire coils attached to the lens holder carry electric currents that generate magnetic force interacting with the magnets and moving the lens holder relative to the pickup body. Both a focusing coil and a radial coil are used to effect and control focus and radial movement, respectively. The position of the focusing lens is controlled with the lens holder being driven in accordance with the control signals flowing into the focusing and tracking coils.

Background: Tracking

In an optical disc apparatus, the pickup is movable along the radius of the optical disc. During access, the pickup is moved to the location where desired data is stored. In a high-speed optical disc apparatus, such as that in a DVD-ROM drive, the pickup can be moved so quickly during the gross positioning of the pickup, that vibration of the lens holder relative to the pickup occurs. Such vibration can become great enough that the lens continues vibrating even after the pickup has reached the approximate target location on the optical disc and fine position positioning of the pickup is occurring. The typical vibration frequency can be between 20 and 60 Hz. Such vibration results in poor pulling operation for tracking. That is, once the target location is reached and data can be read, the light beam passing through the object lens does not follow a certain track, takes a long time to follow the track, or takes a different time to follow each time the track is accessed. However, even when fine position control is activated to keep the beam spot at the target location, the beam spot moves away due to residual vibration caused by the movement of the pickup. This movement results in more time having to be spent to move the beam spot back to the target location. Thus, there is need for a method of lens position control which eliminates vibration during pickup movement.

Center Error

FIG. 5 depicts a laser beam spot 502 reflected from an optical disc onto a photo-detector array 102. The example array is a four-point tracker array. That is, the array is divided into four quadrants: a, b, c, and d; each with its own photodiode and photo-detector output. The laser beam spot 502 depicted is at its peak as it is not being scattered by patterns. However, the beam spot 502 is being biased towards one side of the dividing line parallel to the track direction of the pickup. Track direction is the vector in the image plane of the photo-detector array which corresponds to the direction in which patterns are read off the surface of the DVD medium. The bias is due to the lens axis being shifted away from the optical axis in the radial direction of the disc. This is the type of bias that can occur due to vibration caused by pickup movement.

This bias (or lens shift) in the reflection of the beam spot causes the divisions of the photo-detector array to be illuminated to different degrees. This varying degree of illumination of the photo-detector is known as "center error". Presence of center error indicates that the beam spot is not in the proper position to read data from the optical disc. Ideally, each of the divisions of the photo-detector array are illuminated equally. Equal illumination of the array divisions indicates that the focusing lens is in the proper position. When the focusing lens is not properly positioned, data may not be read correctly from the disc.

Background: Prior Art

In U.S. Pat. No. 4,744,068 there is disclosed a method of lens position detection by sampling the difference signal between suitable pairs of photo-detector output signals. This difference signal is directed through a low-pass filter to remove the high-frequency noise from the signal caused by a sample-hold circuit and then provided to a servo controller. The servo controller can then control the radial position of the lens during pickup movement.

The lens position detection method used in U.S. Pat. No. 4,744,068 suffers from several shortcomings. First, reflectivity changes can take place on the optical disc. Such changes in reflectivity can be due to fingerprint smudges or other foreign matter on the surface of the disc. Changes in disc reflectivity can cause changes in the output levels of the photo-detector array. The changes, in turn, can result in lens position detection signal level changes. The lens position detection method described in U.S. Pat. No. 4,744,068 does not provide for the prevention of modulation of the lens position detection signal due to changes in disc reflectivity. Modulation in the lens position detection signal may result in a misleading indication that the lens has shifted. This misleading indication leads to uncertainty in the relationship of the lens position detection signal and the actual position of the lens.

Second, the lens position detection signal is sensitive to the precise timing of sampling. In high-speed optical disc accessing, the track-crossing rate can be in excess of 1 MHz. An RF signal is created by modulation of signals from the photo-detector array due to crossing of patterns on the optical disc. The peak detection circuit described in U.S. Pat. No. 4,744,068 is designed to remove the RF signal noise caused by the sample-hold circuit. Filtering of the RF signal can result in a delay of close to 1 microsecond. This delay can then perpetuate itself into a delay in the sampling of the lens position detection signal by almost one full track.

Third, the lens position detection signal described in U.S. Pat. No. 4,744,068 is not updated while the beam spot is on track. That is, the lens position detection signal is only functioning to correct the lens position when the lens is between tracks (or "off track"). Problems with this lack of update manifest themselves when track crossing is slow. Slow track crossing occurs due to the deceleration of the pickup during approach to a target track. As the pickup slows, the length of time that the pickup is on track increases resulting in increasing delay between the actual lens position and the last lens position detection signal.

Finally, lens vibration is caused by the motion of the pickup. In high-speed optical devices, the motion of the pickup is quite fast during track seeks. Even though the pickup decelerates as it approaches the proper track, the ceasing of motion once the track is located can cause the lens to vibrate for some time. Since the lens position detection signal described in U.S. Pat. No. 4,744,068 is not updated when the beam spot is on track, it is unusable once the pickup reaches its target track. However, it is necessary for lens vibration control to continue after the beam is on track in order to eliminate the vibration caused by track seek operation.

Other features of optical disc apparatus are contained in the following U.S. Pat. Nos. 4,811,320; 4,845,699; 5,241,522; and 5,446,713; all of which are hereby incorporated by reference.

Optical Disc Apparatus with Lens Position Detection and Control

The present application discloses a lens position detection method using a signal which is continuously updated and is regulated by the total light reflected from the optical disc. The disclosed lens position detection signal overcomes the problems of the methods currently in use. The disclosed method provides lens position detection information for fine positioning of the focusing lens 208. (Gross positioning of the pickup is a separate issue which must be addressed by other control information.) Methods such as track counting or look-up tables can be used to provide gross positioning information for the control of the pickup.

The disclosed lens detector signal uses the top envelope of the photo-detector array output signals to determine the center error of the beam spot on the optical disc. The photo-detector array is divided (preferably into equal parts) along a line which corresponds to the track direction of the pickup. The top envelope values of the intensity of the reflected beam spot received in each part of the photo-detector array are sampled. The center error (or "lens shift detection") of the beam spot is determined by subtracting the value given by the bottom division from the value given by the top division and dividing the result by the sum of the values of all the divisions. The resulting value is used by the optical drive apparatus to control the vibration of the lens.

One of the advantages of calculating center error using envelope detection is that the center error value can be updated continuously without regard to whether the beam spot is on track. This constant availability allows for the control of lens vibration once the pickup is on track.

Another advantage of calculating center error in this manner is that lens vibration can be constantly controlled. Control of the lens can take place even during track seek.

Another advantage of calculating center error in this manner is that it is not as susceptible to changes in disc reflectivity. Therefore, modulation of the lens position detection signal caused by fingerprint smudges, etc. is prevented.

Another advantage of calculating center error in this manner is that, unlike the current methods, there is no delay due to the removal of RF signal noise due to the sampling of the data. As the lens position detection signal is sensitive to the timing of the sample, the elimination of such a delay removes an obstacle to faster track seek times.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 1 depicts the preferred embodiment of the lens position detection signal disclosed herein.

FIG. 2 illustrates a typical optical disc apparatus for reading information from an optical disc.

FIGS. 3A–B depict photo-detector circuits.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Top Envelope Detection

The top envelope is the peak of the RF signal received from the photo-detector array whenever the beam spot scans a part of the optical disc that does not contain a pattern (usually in the form of pits). Unlike the bottom envelope, the top envelope does not change during track crossing or while the beam is on track. It is a continuous indicator of the reflected light received at the photo-detector array which is unaffected by the scattering effect of patterns or pits on the disc. Therefore, the top envelope is always available and can be used for lens position detection without regard to the position of the lens in relation to the tracks of an optical disc.

FIG. 3A depicts a typical photo-detector circuit. Light 302 reflected from the optical disc is received by a photodiode 304 and is converted to electric current. The anode of the photodiode 304 is connected to the positive power supply Vcc and the cathode of the photodiode 304 is connected to the operational amplifier 308. The resulting photo-detector output 112 is a voltage relative to a fixed voltage Vref.

Figure 4A:
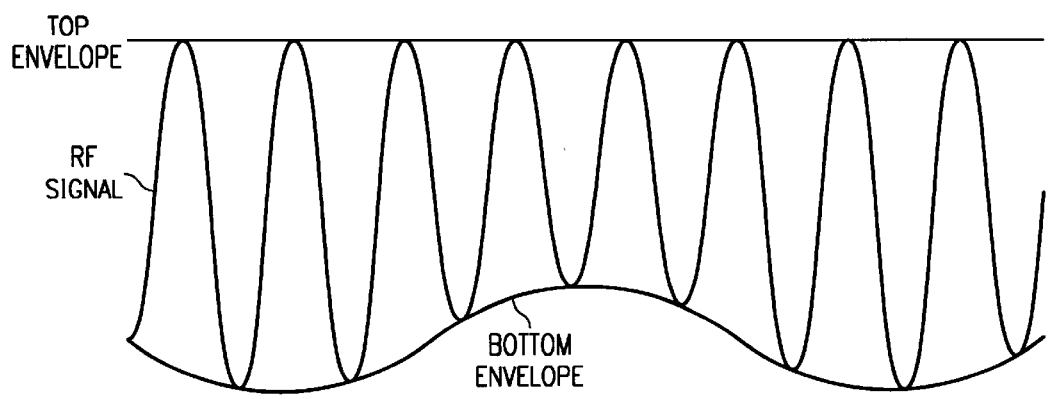
FIGS. 4A–B depict RF output signals of a photo-detector circuit during track crossing.

FIG. 4A depicts a typical RF output signal during track crossing of the photo-detector signal 112 described in FIG. 3A. FIG. 4A illustrates that the top envelope of the photo-detector output signal 112 is a continuous indicator of the reflected light received at the photodiode unaffected by the scattering effect of patterns or pits. That is, the top envelope remains constant. The RF signal reaches the top envelope whenever the beam spot scans a portion of the disc where there is no pattern. Where the beam spot scans a patterned portion of a disc, the RF signal dips to varying depths depending on the length of the pattern. The RF signal reaches the bottom envelope whenever the beam spot scans a pattern whose length exceeds the beam spot diameter. When the beam spot is on track, the RF signal swing is maximal. When the beam spot is on mirror, that is, focused on an area between tracks where there is no pattern, the RF signal swing is smallest. However, whether the beam spot is on track or on mirror, the top envelope does not change during track crossing whereas the bottom envelope does so once per track crossing.

Center Error Signal

As described above, FIG. 5 depicts a laser beam spot 502 which is biased in the tracking direction of the focusing lens 208 to create center error. Detection of the amount of lens shift or center error can be accomplished by a calculation using the top envelope output signals of the photo-detector array. Center error (or "CE") can be described using the following equation;

$$CE = \frac{[top(a) + top(d)] - [top(b) + top(c)]}{top(a) + top(b) + top(c) + top(d)}$$

where top(x) is the photo-detector output signal of division x of the photo-detector array when the signal is at its peak.

Figure 6A:
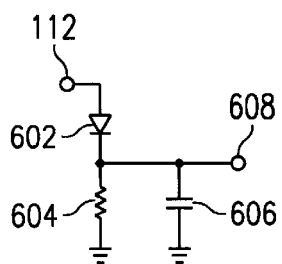
FIGS. 6A–C depict methods of envelope detection.

Since the photo-detector signal is continuously supplied, the top envelope must be detected in order to provide the value top(x) for the evaluation of CE. One way to implement top envelope detection is shown in FIG. 6A. In FIG. 6A, a diode with a low-pass filter is used to create a top envelope detection signal. The photo-detector output signal 112 for a given element of a photo-detector array is supplied to a diode 602. The output of the diode 602 is connected to a low-pass filter consisting of a resistor 604 and a capacitor 606.

When the laser beam spot is on pattern, the photo-detector output signal 112 is at or near the bottom envelope and the voltage of the signal 112 is relatively low. As the laser beam spot moves off pattern and onto mirror, the voltage increases until the entire laser beam spot is on mirror. The photo-detector output signal 112 is connected to the diode 602. As the voltage from the signal 112 increases, the capacitor 606 charges. When the voltage from the photo-detector signal 112 drops, as when the laser beam spot moves off mirror onto pattern, the diode 602 turns off. Charge is then leaked off of the capacitor 606. The charge is slowly leaked away from the capacitor 606 so the top envelope signal 608 follows any drop which may have occurred in the top envelope of the photo-detector output signal 112, but not the photo-detector output signal 112 itself. The top envelope detection signal 608 for a given division of the photo-detector array, x is top(x).

Figure 6B:
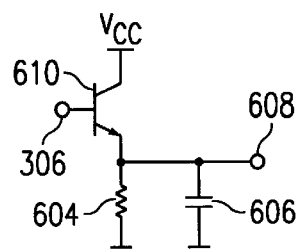

Another way to implement top envelope detection is shown in FIG. 6B. In FIG. 6B, a transistor 610 is used in place of the diode 602 of FIG. 6A in conjunction with a low-pass filter to create a top envelope detection signal. The photo-detector output signal 112 for a given element of a photo-detector array is supplied to the base of a transistor 610 with its emitter connected to ground. The collector of the transistor 610 is connected to a positive power supply. The low-pass filter consisting of a resistor 604 connected to a capacitor 606 is connected to the emitter of the transistor 610. Use of a transistor in place of a photodiode reduces the current drawn from the photo-detector circuit's output by the envelope signal.

In either top envelope detection implementation described above, the top envelope signal 608 is shifted down by one $V_{be}$. To correct this shift in voltage, the equivalent of one $V_{be}$ must be added back to the top envelope signal at some point. This can be accomplished by measuring the top envelope signal when laser diode 202 is turned off. Such a measurement will produce a value of $(V_{ref}-V_{be})$ which can then be subtracted the top envelope signal to ensure accuracy in subsequent calculations of CE.

Calibration

In addition to calculating the base CE, two calibration values need to be calculated. First, the DC offset of the center error signal must be calibrated. Even without any input bias in the lens radial actuator input, the reflected beam spot may not be divided equally between both sides of the photo-detector array parallel to the track direction of the optical disc. Such offsets may be caused by error in mechanical alignment during manufacturing. A calibration value, $CE_0$, for errors due to such misalignment can be calculated.

$CE_0$ is calculated when an optical disc is loaded, rotation of the disc has begun, and the light beam is properly focused onto the disc. The initiation of tracking is irrelevant. At this point, a CE calculation is made with zero radial actuator input. The resultant CE value, $CE_0$, is the DC offset to be subtracted from CE in all subsequent calculations.

Figure 7:
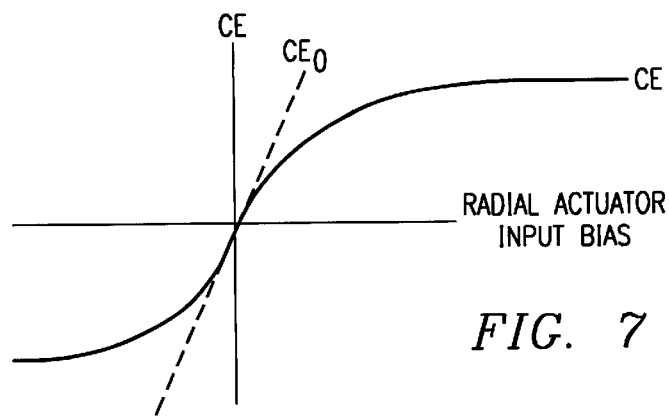
FIG. 7 depicts the curve obtained by sweeping the radial actuator input bias through a positive and a negative range.

Next, the output levels of the CE signal must be calibrated so that the top envelope can be properly detected. To measure the CE gain ($CE_D$), the radial actuator input bias is swept through a positive and a negative range, such that a curve like that depicted in FIG. 7 is obtained. $CE_D$ is the slope of CE when the input bias is at 0. The offset-calibrated $CE_C=CE-CE_0$ is divided by $CE_D$ to produce the calibrated and normalized $CE_N=CE_C/CE_D$.

Implementation

FIG. 1 depicts the preferred embodiment of the lens position detection signal disclosed herein. The photo-detector array 102 is divided in half, parallel to the track direction of the optical disc apparatus. The output signals of photo-detectors a and b (as described in FIG. 3A) are connected to top envelope detectors 104, described in FIG. 6A. The resulting output signals top(a) and top(b) are quantized by an analog-to-digital converter 106 both with the laser diode 202 turned off and turned on for input into a digital-signal-processor (DSP) 108. The correction of the level shift of the top envelope signal is performed by the DSP. Then the calculation of CE:

$$CE = \frac{top(a) - top(b)}{top(a) + top(b)}$$

is performed inside the DSP 108. Automatic gain control is performed by the DSP when the calculation of CE is performed, compensating for changes in reflectivity that may result from fingerprints or other foreign matter on the surface of the optical disc. The DSP 108 is also used for the calibration calculations to produce $CE_N$. In the preferred embodiment, the DSP utilizes an internal algorithm to compute an appropriate control output signal 110 from $CE_N$.

Figure 8:
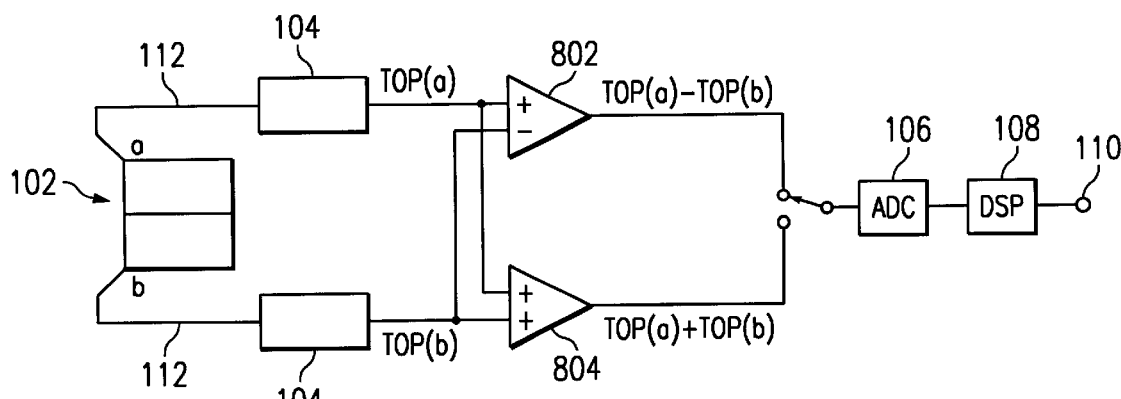
FIG. 8 depicts an alternative embodiment of the lens position detection signal disclosed.

FIG. 8 depicts an alternative embodiment of the lens position detection signal disclosed. In this embodiment, a pair of operational amplifiers 802 and 804 are used to calculate top(a)–top(b) and top(a)+top(b) respectively. Only the top(a)+top(b) value needs to be corrected for top envelope shift by the DSP in this embodiment as the calculation of top(a)–top(b) cancels out the effect of the shift. The top(a)+top(b) needs to quantized by the analog-to-digital converter 106 both with the laser diode 202 turned off and turned on in order to provide the DSP with the proper values to correct the shift. The final calculation of $CE_N$ and the computation of an appropriate control output signal 110 is still performed inside the DSP 108.

Figure 9:
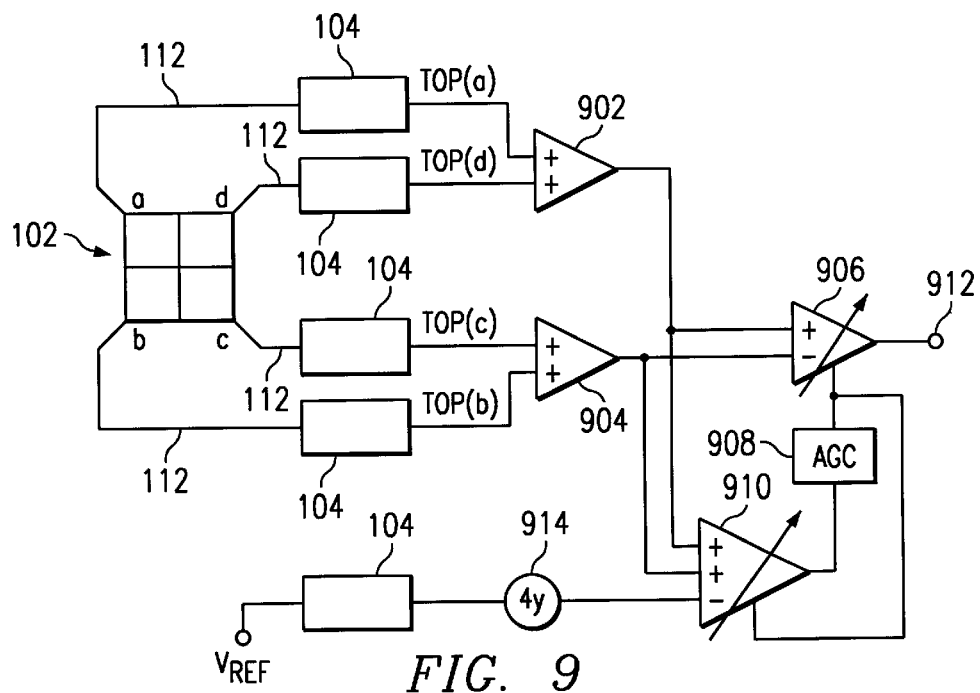
FIG. 9 depicts an alternative embodiment of the lens position detection signal disclosed.

FIG. 9 depicts another alternative embodiment of the lens position detection signal disclosed. In this embodiment, the photo-detector array 102 is divided into quadrants as in FIG. 5. The output signals of photo-detectors a, b, c, and d are connected to top envelope detectors 104, described in FIG. 6A. The resulting output signals top(a) and top(d) are added at an operational amplifier 902. Output signals top(b) and top(c) are added at an operational amplifier 904. The output of amplifiers 902 and 904 is added together at operational amplifier 910 to form the denominator of the CE calculation: top(a)+top(b)+top(c)+top(d). A top envelope shift correction value, based on the top envelope detection signal of $V_{ref}$, is calculated. The signal is multiplied by four, once for each top(x) signal used in the denominator. The signal is then subtracted from top(a)+top(b)+top(c)+top(d) at operational amplifier 910. An automatic gain control unit 908 is used to normalize the total of the top envelope signals from the photo-detector array, compensating for changes in reflectivity that may result from fingerprints or other foreign matter on the surface of the optical disc. At operational amplifier 906, the output of operational amplifier 904 is subtracted from the output of operational amplifier 902 and the result is divided by the normalized output of operational amplifier 910. The CE signal 912 resulting can then be calibrated with $CE_0$ and $CE_D$.

In an alternative embodiment to that described in FIG. 9, CE can be calculated solely from top(a) and top(b), eliminating the need for operational amplifiers 902 and 904.

Bottom Envelope Detection

In an alternative embodiment, the center error of the beam spot on the optical disc can be determined using bottom envelope error detection.

FIG. 3B depicts an alternative photo-detector circuit. Light 302 reflected from the optical disc is received by a photodiode 304 and is converted into electric current. However, the anode of the photodiode 304 is connected to the operational amplifier 308 and the cathode is connected to the positive power supply. The resulting photo-detector output signal 112 is a voltage relative to a fixed voltage Vref.

Figure 4B:
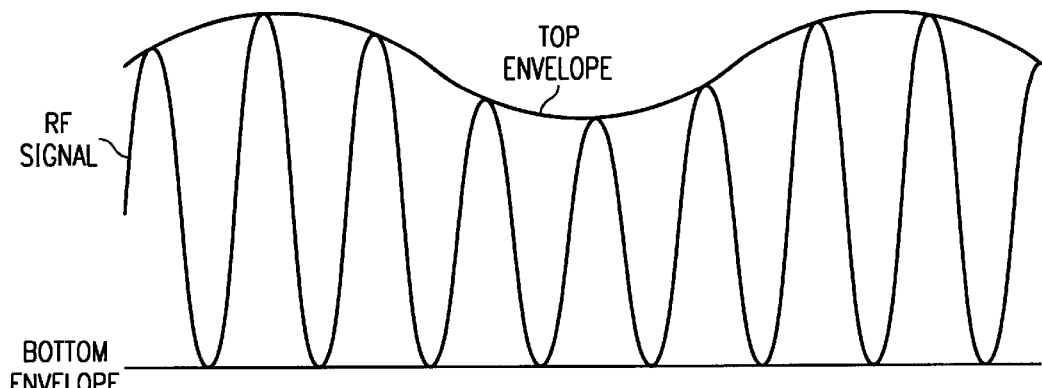

FIG. 4B depicts the RF output signal during track crossing of the photo-detector signal 112 described in FIG. 3B. FIG. 4B illustrates that the bottom envelope of the photo-detector output signal is now a continuous indicator of the reflected light received at the photodiode unaffected by the scattering effect of patterns or pits. That is the bottom envelope remains constant. The RF signal reaches the bottom envelope whenever the beam spot scans a portion of the disc where there is no pattern. Whether the beam spot is on track or on mirror, the bottom envelope does not change during track crossing whereas the top envelope does so once per track crossing.

Figure 6C:
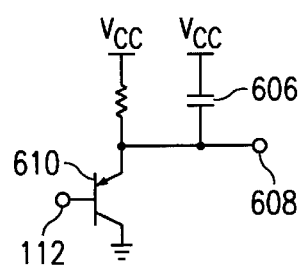

Bottom envelope detection must be implemented in order to calculate CE based on bottom envelope error. One way to implement bottom envelope detection is depicted in FIG. 6C. In FIG. 6C, a transistor 610 is used in place of the diode 602 of FIG. 6A in conjunction with a capacitive filter to create a bottom envelope detection signal. The photo-detector output signal 112 for a given element of a photo-detector array is supplied to the base of a transistor 610 with its collector connected to ground. The emitter of the transistor 610 is connected to a capacitive filter consisting of a resistor 604 connected to a positive power supply and a capacitor 606.

When the laser beam spot is on pattern, the photo-detector output signal 112 is at or near the top envelope and the voltage of the signal 112 is relatively high. As the laser beam spot moves off pattern and onto mirror, the voltage decreases until the entire laser beam spot is on mirror. As the voltage from the signal 112 decreases, the capacitor 606 charges. When the voltage from the photo-detector signal 112 begins to rise, as when the laser beam spot moves off mirror onto pattern, the transistor 610 is open. Charge is then leaked off of the capacitor 606. The charge is slowly leaked away from the capacitor 606 so the bottom envelope detection signal 608 follows any rise which may have occurred in the bottom envelope of the photo-detector output signal 112, but not the photo-detector output signal 112 itself. The bottom envelope detection signal 608 for a given division of the photo-detector array, x is bottom(x).

CE, including the CE calibration routines, can now be calculated as described above by substituting bottom(x) for top(x). Further, the embodiments described in FIGS. 1, 8, and 9 can be implemented using bottom envelope detection at 104 in place of top envelope detection.

Figure 10:
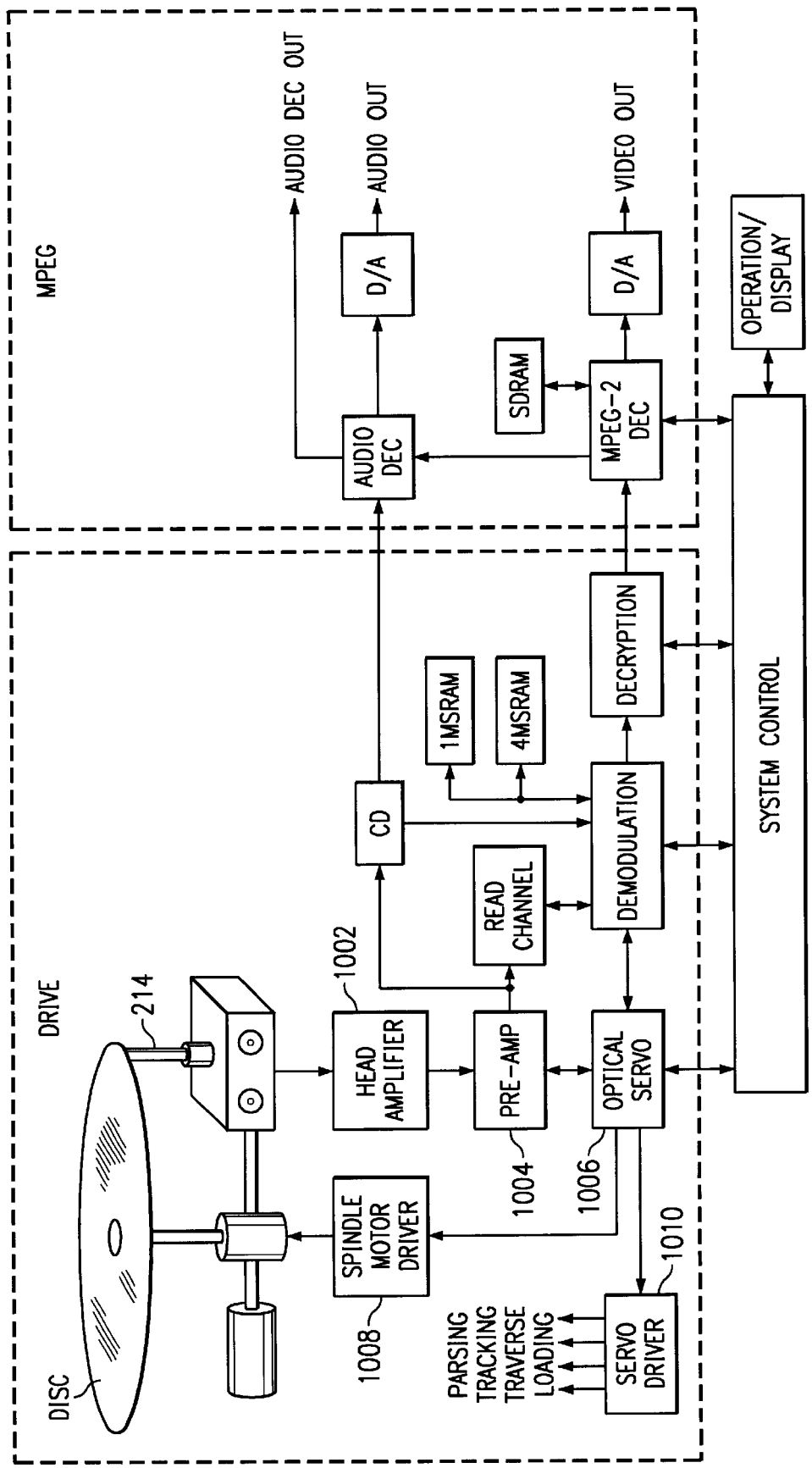
FIG. 10 depicts a system diagram of a commercial DVD player which can utilize the innovative lens position detection control.

FIG. 10 depicts a system diagram of a commercial DVD-ROM drive used in computers which can use the innovative lens position detection control for high speed operations. The lens position detection control signal is used to provide focusing control information for the pickup 214. The signals from a photo-detector array are amplified in head amplifier 1002. The signal is then passed to a pre-amplifier 1004. From the preamplifier 1004, the signal can be processed as a data signal or passed to the optical servo 1006 and used for control of the optical apparatus. The optical servo 1006 controls the spindle motor through a spindle motor driver 1008. This motor drives the optical disc and positions the pickup 214. The optical servo passes the photo-detector control signals to a servo driver 1010. The servo driver 1010 controls focus, tracking, traversal of the disc and disc loading operations. It is in the servo driver that the lens position detection control signal is calculated and utilized to control the focus of the pickup 214.

Data from the optical disc is processed as either audio or video data. If no demodulation of the signal is required, audio data is passed into the MPEG portion of the system. The audio signal is decoded to create a standard digital audio signal and can be passed out as a digital data stream or converted to an analog output. If the signal is data it is passed to the read channel block. The data signal, or the audio signal if required, is then passed to a demodulation block. The signal is then passed to a block where it is decrypted, if necessary. The signal can then be passed to the MPEG portion of the system. The signal is decoded according to the MPEG-2 standard. If the signal is an audio signal, it is passed to the audio decoding block. If the signal is a video signal, it is converted to an analog signal for further use outside the system. The optical servo 1006, demodulation, decryption, and MPEG-2 decoding blocks are controlled by a system controller. The system control also controls the DVD display panel and user operation functions (operation/display block).

Modifications and Variations

As will be recognized by those skilled in the art, the innovative concepts described in the present application can be modified and varied over a tremendous range of applications, and accordingly the scope of patented subject matter is not limited by any of the specific exemplary teachings given, but is only defined by the issued claims.

To perform lens position detecting, the photo-detector array needs to be divided, parallel to the track direction, into at least two sections. However, as is illustrated by some alternative embodiments, the array can be divided into more than two sections and still provide an appropriate lens position detecting signal.

The correction of the top envelope signal due to shift of the signal by $V_{be}$ described in the presently preferred embodiment, is merely one way of correcting the signal. The signal could be corrected when the top envelope detection signal is first sampled. A bona fide top envelope detection circuit without level shifting can be obtained by shifting signal 608 by 1 $V_{be}$. Such a circuit can be accomplished by a transistor used to implement the shift in the signal.

The photo-detector array is described as being divided in half along the track direction, or being divided into quadrants. However, the array may be divided into any number of divisions of equal surface area and some or all of the photo-detectors from each half, when divided parallel to the track direction, can be used for center error calculation, as long as an equal number from each half are used.

The DSP described in the preferred embodiment can be a general purpose DSP. However, it can also be a microcontroller, a microprocessor, or an arithmetic hardware circuit. The DSP can also be embedded as part of an application specific integrated circuit (or "ASIC").

In the preferred embodiment, the voltage, Vref, is a fixed voltage, typically 2.5V. However, Vref can be more or less depending on the nature of the application.

Figure 5:
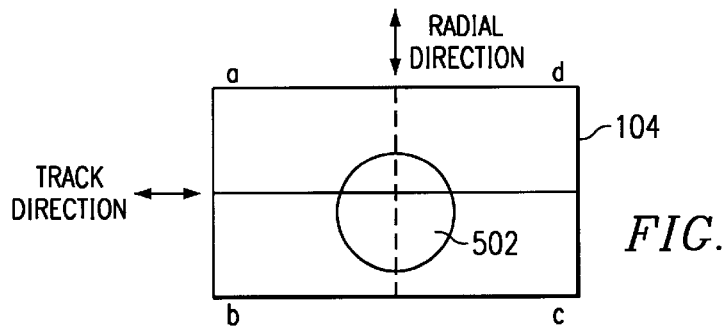
FIG. 5 depicts a laser beam spot reflected from an optical disc onto a photo-detector array.

The detection of the top envelope described in FIG. 5 is merely one way of such detection. Other ways of top envelope detection could be implemented as long as the top(x) signal is supplied.

In the preferred embodiment, a single analog-to-digital converter (ADC) is used to quantize both top envelope signals for use by the DSP. However, multiple ADCs could be utilized, one for each top envelope detection signal, to quantize the signals needed for the CE calculation.

What is claimed is:

1. A method of fine control of lens position of an optical disc apparatus, comprising the steps of:

receiving a pair of photo-detector signals corresponding to radially separated disc locations;

for each said signal received, calculating a respective envelope signal; and performing fine lens position control in accordance with the difference of said envelope signals, wherein said photo-detector array is divided into quadrants, and signals from only one quadrant in each half of said photo-detector array parallel to said track direction are used to calculate said envelope signals.

2. The method of claim 1 wherein said envelope signal is a top envelope signal.

3. The method of claim 1 wherein said envelope signal is calculated using a diode and a low-pass filter.

4. The method of claim 1 wherein said envelope signal is calculated using a transistor and a low-pass filter.

5. A DVD-ROM drive system, comprising:

(d.) an optical disc apparatus;

(e.) a lens positioning mechanism; and (f.) lens position detection control, comprising:

a photo-detector array divided in half parallel to the track direction of an optical disc apparatus which generates a pair of photo-detector signals, one from each half of said photo-detector array;

envelope detection circuits which are each connected to a different one of said photo-detector signals and generate an envelope detection signal for each photo-detector signal; and an arithmetic circuit connected to subtract said envelope signal from the bottom half of said photo-detector array from said envelope signal from the top half of said photo-detector to produce a center error signal and drive said lens positioning mechanism accordingly, wherein said lens position detection control further comprises an analog-to-digital converter and a digital signal processor, wherein said envelope signals are connected to and quantized by said analog-to-digital converter, and said digital signal processor is connected to receive the output of said analog-todigital converter, and the function of said arithmetic circuit is performed in said digital signal processor.

6. A method of fine control of lens position of an optical disc apparatus, comprising the steps of:
receiving a pair of photo-detector signals corresponding to radially separated disc locations;
for each said signal received, calculating a respective envelope signal;
performing fine lens position control in accordance with the difference of said envelope signals; and
correcting a shift of said envelope signal by using a digital processor.

7. A method of fine control of lens position of an optical disc apparatus, comprising the steps of:
receiving a pair of photo-detector signals corresponding to radially separated disc locations;
for each said signal received, calculating a respective envelope signal;
performing fine lens position control in accordance with the difference of said envelope signals, and
calculating a lens position detection signal to perform a fine lens position control in according with the differences of said envelope signals.

8. A method of fine control of lens position of an optical disc apparatus, comprising the steps of:
receiving a pair of photo-detector signals corresponding to radially separated disc locations;
for each said signal received, calculating a respective envelope signal; and
performing fine lens position control in accordance with the difference of said envelope signals,
wherein said envelope signals are quantized and passed to a digital processer and said difference of said envelope signals as obtained by a subtracting and dividing operations performed in said digital processor.

9. A method of fine control of lens position of an optical disc apparatus, comprising the steps of:
receiving a pair of photo-detector signals corresponding to radially separated disc locations;
for each said signal received, calculating a respective envelope signal; and
performing fine lens position control in accordance with the difference of said envelope signals,
wherein an automatic gain control device is used to normalize a sum of said envelope signals for compensating for reflectivity changes in the photo-detector signals.

10. A method of fine control of lens position of an optical disc apparatus, comprising the steps of:
receiving a pair of photo-detector signals corresponding to radially separated disc locations;
for each said signal received, calculating a respective envelope signal;
performing fine lens position control in accordance with the difference of said envelope signals, and
performs calculating a lens position detection signal to perform a fine lens position control in according with the differences of said envelope signals.

11. A method of fine control of lens position of an optical disc apparatus, comprising the steps of:
receiving a pair of photo-detector signals corresponding to radially separated disc locations;
for each said signal received, calculating a respective envelope signal;
performing fine lens position control in accordance with the difference of said envelope signals, and
calculating a lens position detection signal to perform a fine lens position control in according with the differences of said envelope signals.

12. A method of fine control of lens position of an optical disc apparatus, comprising the steps of:
receiving a pair of photo-detector signals corresponding to radially separated disc locations;
for each said signal received, calculating a respective envelope signal; and
performing fine lens position control in accordance with the difference of said envelope signals,
wherein said lens position detection signal is first calculated with zero input of a radial actuator to obtain a center error offset, and a gain is calculated as the slope of said lens position detection signal at 0 when the radial actuator bias is swept through a positive and negative range, and said center offset is subtracted from each successive calculation of said lens position detection signal, and said lens position detection signal is adjusted according to said gain.

13. A method of lens position detection signal calculation for fine control of lens position of an optical disc apparatus, comprising the steps of:
receiving a photo-detector signal, from each of four or more divisions of a photo-detector array;
for each said signal received, calculating an envelope signal; subtracting the sum of said envelope signals of said photo-detectors in the bottom half of said photo-detector array respective to a division parallel to the track direction of said optical disc apparatus from the sum of said envelope signals in the top half of said photo-detector array respective to a division parallel to said track direction of said optical disc apparatus to obtain a result; and
dividing the result obtained by the sum of all said envelope signals to calculate said lens position detection signal.

14. The method of claim 13 wherein said envelope signal is a top envelope signal.

15. The method of claim 13 wherein said envelope signal is calculated using a diode and a low-pass filter.

16. The method of claim 13 wherein a digital signal processor is used to correct shift of said envelope signal.

17. The method of claim 13 wherein said envelope signals are quantized and passed to a digital signal processor, and said subtracting and dividing are performed in said digital signal processor.

18. The method of claim 13 wherein an automatic gain control device is used to normalize the sum of said envelope signals.

19. The method of claim 13 wherein said lens position detection signal is first calculated with zero input of a radial actuator to obtain a center error offset, and a gain is calculated as the slope of said lens position detection signal at 0 when the radial actuator bias is swept through a positive and negative range, and said center offset is subtracted from each successive calculation of said lens position detection signal, and said lens position detection signal is adjusted according to said gain.

20. A method of producing a lens position detection signal for fine control of an optical disc apparatus, comprising the steps of:
(a.) receiving a pair of photo-detector signals, one from each part of a photo-detector array divided in half parallel to the track direction of said optical disc apparatus;

(b.) for each said signal received, calculating an envelope signal;

(c.) subtracting said envelope signal of said photo-detector below said division from said envelope signal of said photo-detector above said division to obtain a result; and (d.) dividing the result obtained in step (c.) by the sum of said envelope signals;

(e.) performing steps (a.)–(d.) with zero input of a radial actuator to calculate an offset;

(f.) calculating a gain by sweeping the input bias of said radial actuator of said optical disc apparatus through a positive and negative range and determining the slope of the result of step (d.) when said input bias is 0;

(g.) performing steps (a.)–(d.) to calculate a center error;

(h.) subtracting said offset from said center error; and (i.) adjusting the result obtained in accordance with said gain to produce said lens position detection signal.

21. The method of claim 20 wherein said envelope signal is a top envelope signal.

22. The method of claim 20 wherein said envelope signal is calculated using a diode and a low-pass filter.

23. The method of claim 20 wherein a digital signal processor is used to correct the shift of the envelope signal of the result.

24. The method of claim 20 wherein said envelope signals are quantized and passed to a digital signal processor, and steps (c.), (d.), (h.), and (i.) are performed in said digital signal processor.

25. The method of claim 20 wherein an automatic gain control device is used to normalize the sum of said envelope signals.

26. A system of producing a lens position detection signal for fine control of lens position of an optical disc apparatus, comprising:

a circuit for receiving a photo-detector signal from each division of a photo-detector array divided in half parallel to the track direction of an optical disc apparatus;

a circuit for calculating an envelope detection signal for each photo-detector signal received;

a circuit for subtracting said envelope signal from the bottom half of said photo-detector array respective to a division parallel to said track direction from said envelope detection signal from the top half of said photo-detector array respective to a division parallel to said track direction; and a circuit for dividing the result obtained by the sum of all said envelope signals to calculate said lens position detection signal, wherein said photo-detector array is divided into four or more divisions and generates signals from an equal number of divisions in each half of said photo-detector array parallel to said track direction.

27. A system of producing a lens position detection signal for fine control of lens position of an optical disc apparatus, comprising:

a circuit for receiving a photo-detector signal from each division of a photo-detector array divided in half parallel to the track direction of an optical disc apparatus;

a circuit for calculating an envelope detection signal for each photo-detector signal received;

a circuit for subtracting said envelope signal from the bottom half of said photo-detector array respective to a division parallel to said track direction from said envelope detection signal from the top half of said photo-detector array respective to a division parallel to said track direction;

a circuit for dividing the result obtained by the sum of all said envelope signals to calculate said lens position detection signal; and a circuit for correcting shift of said envelope detection signal.

28. A system of producing a lens position detection signal for fine control of lens position of an optical disc apparatus, comprising:

a circuit for receiving a photo-detector signal from each division of a photo-detector array divided in half parallel to the track direction of an optical disc apparatus;

a circuit for calculating an envelope detection signal for each photo-detector signal received;

a circuit for subtracting said envelope signal from the bottom half of said photo-detector array respective to a division parallel to said track direction from said envelope detection signal from the top half of said photo-detector array respective to a division parallel to said track direction;

a circuit for dividing the result obtained by the sum of all said envelope signals to calculate said lens position detection signal; and a circuit for calculating a center error offset and means for calculating a center error gain and means for correcting said lens position detection signal according to said center error offset and center error gain values.

29. A DVD-ROM drive system, comprising:

(a.) an optical disc apparatus;

(b.) a lens positioning mechanism; and (c.) lens position detection control, comprising:

a photo-detector array divided in half parallel to the track direction of an optical disc apparatus which generates a pair of photo-detector signals, one from each half of said photo-detector array;

envelope detection circuits which are each connected to a different one of said photo-detector signals and generate an envelope detection signal for each photo-detector signal; and an arithmetic circuit connected to subtract said envelope signal from the bottom half of said photo-detector array from said envelope signal from the top half of said photo-detector to produce a center error signal and drive said lens positioning mechanism accordingly, wherein said lens position detection control further comprises an analog-to-digital converter and a digital signal processor, wherein the digital signal processor is used to correct the envelope signal shift of the output of said arithmetic circuit.

* * * * *